US009448867B2

(12) United States Patent
Datta et al.

(10) Patent No.: US 9,448,867 B2
(45) Date of Patent: Sep. 20, 2016

(54) PROCESSOR THAT DETECTS WHEN SYSTEM MANAGEMENT MODE ATTEMPTS TO REACH PROGRAM CODE OUTSIDE OF PROTECTED SPACE

(75) Inventors: Shamanna M. Datta, Hillsboro, OR (US); Rajesh S. Parathasarathy, Hillsboro, OR (US); Mahesh S. Natu, Sunnyvale, CA (US); Frank Binns, Portland, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 353 days.

(21) Appl. No.: 13/997,046

(22) PCT Filed: Dec. 31, 2011

(86) PCT No.: PCT/US2011/068281
§ 371 (c)(1),
(2), (4) Date: Jun. 21, 2013

(87) PCT Pub. No.: WO2013/101246
PCT Pub. Date: Jul. 4, 2013

(65) Prior Publication Data
US 2013/0326288 A1    Dec. 5, 2013

(51) Int. Cl.
*G06F 11/00*    (2006.01)
*G06F 11/07*    (2006.01)
*G06F 12/14*    (2006.01)
*G06F 21/52*    (2013.01)

(52) U.S. Cl.
CPC ....... *G06F 11/0754* (2013.01); *G06F 12/1441* (2013.01); *G06F 21/52* (2013.01)

(58) Field of Classification Search
CPC .......... G06F 12/1491; G06F 12/1441; G06F 12/1458; G06F 12/1063; G06F 12/145; G06F 11/1064; G06F 12/14; G06F 12/1425; G06F 21/78; G06F 21/79; G06F 9/30047; G06F 12/1027; G06F 9/3802; G06F 11/1016; G06F 12/00; G06F 12/0292; G06F 11/073
USPC .................................. 714/38.1, 48; 711/163
See application file for complete search history.

(56) References Cited

U.S. PATENT DOCUMENTS

| | | | |
|---|---|---|---|
| 6,986,006 B2 * | 1/2006 | Willman et al. .............. | 711/152 |
| 7,003,676 B1 | 2/2006 | Weber et al. | |
| 7,401,358 B1 * | 7/2008 | Christie et al. ................ | 726/21 |
| 7,496,727 B1 * | 2/2009 | Ludloff et al. ................ | 711/163 |
| 7,496,966 B1 | 2/2009 | McGrath et al. | |
| 7,698,507 B2 * | 4/2010 | Ghetie .......................... | 711/138 |

(Continued)

OTHER PUBLICATIONS

PCT International Search Report for PCT Counterpart Application No. PCT/US2011/068281, 4 pgs., (Sep. 17, 2012).

(Continued)

*Primary Examiner* — Elmira Mehrmanesh
(74) *Attorney, Agent, or Firm* — Nicholson De Vos Webster & Elliott LLP

(57) ABSTRACT

A method is described that includes detecting that a memory access of system management mode program code is attempting to reach program code outside of a protected region of memory by comparing a target memory address of a memory access instruction of the system management program code again information that defines confines of the protection region. The method also includes raising an error signal in response to the detecting.

18 Claims, 4 Drawing Sheets

(56) References Cited

U.S. PATENT DOCUMENTS

| | | |
|---|---|---|
| 7,748,037 B2* | 6/2010 | Rajagopal et al. ............ 726/23 |
| 2003/0217250 A1* | 11/2003 | Bennett et al. ............... 712/224 |
| 2003/0229794 A1* | 12/2003 | Sutton et al. ................. 713/189 |
| 2006/0149918 A1* | 7/2006 | Rudelic et al. ............... 711/202 |
| 2007/0006175 A1* | 1/2007 | Durham et al. .............. 717/131 |
| 2007/0101104 A1* | 5/2007 | Diefendorff .................. 712/225 |
| 2007/0156978 A1* | 7/2007 | Dixon et al. ................. 711/156 |
| 2009/0119748 A1 | 5/2009 | Yao et al. |
| 2009/0172330 A1* | 7/2009 | Dewan et al. ............... 711/163 |
| 2009/0320128 A1 | 12/2009 | Pant et al. |

OTHER PUBLICATIONS

PCT Written Opinion of the International Searching Authority for PCT Counterpart Application No. PCT/US2011/068281, 4 pgs., (Sep. 17, 2012).

PCT Notification concerning Transmittal of International Preliminary Report on Patentability (Chapter I of the Patent Cooperation Treaty) for PCT Counterpart Application No. PCT/US2011/068281, 5 pgs., (Jul. 10, 2014).

\* cited by examiner

US 9,448,867 B2

PROCESSOR THAT DETECTS WHEN SYSTEM MANAGEMENT MODE ATTEMPTS TO REACH PROGRAM CODE OUTSIDE OF PROTECTED SPACE

CROSS-REFERENCE TO RELATED APPLICATION

This patent application is a U.S. National Phase Application under 35 U.S.C. §371 of International Application No. PCT/US2011/068281, filed Dec. 31, 2011, entitled PROCESSOR THAT DETECTS WHEN SYSTEM MANAGEMENT MODE ATTEMPTS TO REACH PROGRAM CODE OUTSIDE OF PROTECTED SPACE.

FIELD OF INVENTION

The field of invention pertains to the computing sciences generally, and, more specifically, to a processor that detects when system management mode attempts to reach program code outside of protected space.

BACKGROUND

System management mode (SMM) is an operating mode of a computing system in which normal execution (including operation of the operating system (OS)) is suspended, and special separate software (usually firmware or a hardware-assisted debugger, hereinafter referred to as "SMM code") is executed in a high-privilege mode. Here, the SMM code is special code that, ideally, fully comprehends the complete hardware details of the particular computing system that it runs on.

Examples of possible SMM functions include: i) centralized system configuration (such as the dedicated configuration of a specific computer); ii) handling of system events like memory or chipset errors; iii) security functions, such as flash device lock down or the forwarding of calls to a Trusted Platform Module (TPM); iv) system safety management functions, such as computer shutdown upon detection of a high CPU temperature, turning fans on/off, etc.; and, v) power management functions such as deep sleep power management and management of voltage regulator modules.

Note that the awareness and reach of the SMM is far reaching for a particular system. That is, typically, the SMM is permitted to have unrestricted access into any aspect of the computer that it runs on. A significant security risk, therefore, is that the SMM might be "highjacked" or otherwise compromised by some form of malware or unwanted code. If the security of the SMM were to be breached, the malware could potentially disrupt or infect normal system operation of any/all components within the system.

Typically, the SMM code is kept in a "highly privileged" region of memory. Part of the definition of the highly privileged and secure aspect of the SMM code is that no other code is permitted to access it within its special region of memory, nor is the SMM supposed to execute code that is stored outside the highly privileged region of memory. Thus, if malware is to attack the SMM, in all likelihood it will be a consequence of the SMM running code or at least making a call to code that is outside of the highly privileged region of memory. Upon this event, malware stored outside the protected region of memory can be incorporated into the operation of the SMM thereby compromising its security.

Unfortunately it is becoming more and more difficult to keep the SMM code within the confines of the protected region of memory. The difficult stems not only from the increasing sophistication of the SMM code (as a function of increasingly complex hardware platforms and associated features), but also, the reliance on, within the SMM, of OEM code provided by OEM manufacturers of the different components that the system is composed of.

FIG. 1 shows a typical transition from normal operating mode into SMM mode. Upon the detection of an event 101 that is supposed to trigger the SMM code (such as a configuration event, a power management, etc.), a processor will save its state 102. After the processor state is saved, SMM begins execution out the protected region of memory 103.

BRIEF DESCRIPTION OF THE DRAWINGS

The present invention is illustrated by way of example and not limitation in the figures of the accompanying drawings, in which like references indicate similar elements and in which.

DESCRIPTION

A solution to the problem of not being able to sufficiently control when or how SMM code might attempt to reach code outside the protected region of memory, is to build into the hardware of the processor a mechanism for detecting and reporting an attempt by the SMM code to reach program code that is outside the protection memory space.

Figure 1:
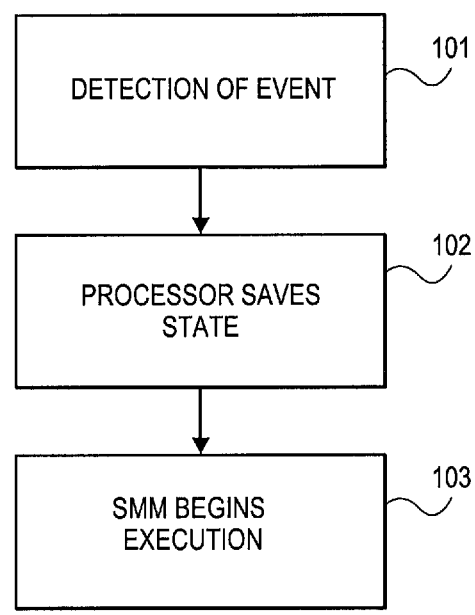
FIG. 1 shows a prior art SMM start up sequence.
Figure 2:
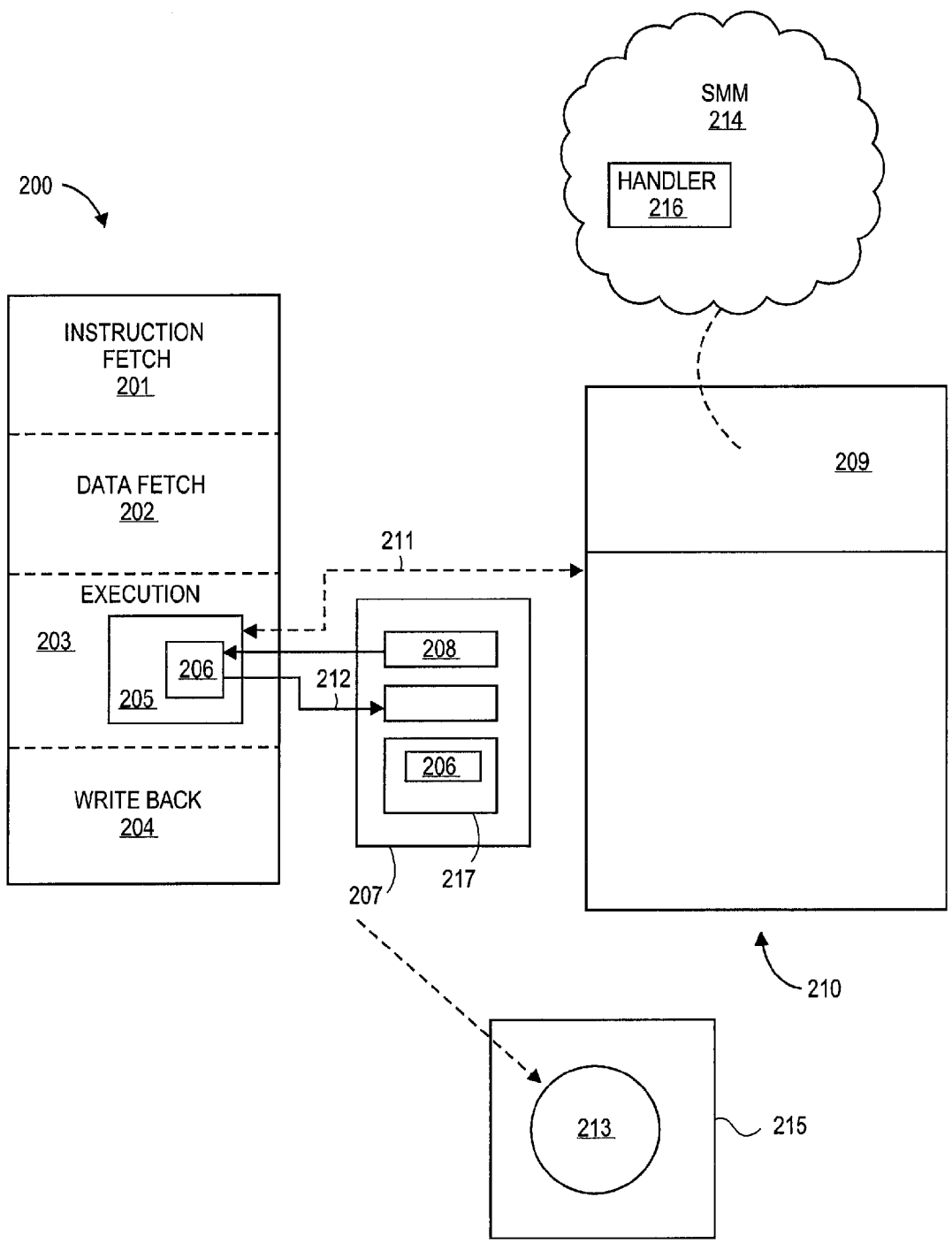
FIG. 2 shows a system that can detect when SMM attempts to reach program code that is outside of protected space.

FIG. 2 shows an embodiment of a generic processor pipeline 200. The processor includes an instruction fetch stage 201, a data fetch stage 202, an execution stage 203 and a write back stage 204. As is known in the art, the execution stage 203 includes various functional units that execute the different instructions supported by the pipeline 200 and, thereby, the processor. One or more of these execution units is typically a memory access unit 205, or simply, memory unit, whose purpose is to fetch data or instructions from memory.

In a typical case, an instruction is presented to the memory unit 205 having an operand that specifies an address in memory 210 where an item of data or an instruction is located (or a "page" of memory 210 where the item of data or instruction is located). The memory unit 205 typically includes a hardware table walk or page-walk unit 206 that coordinates the read of the information from memory 210 (e.g., by issuing or overseeing a read transaction 211 directed to system memory 210 for the desired information).

In one embodiment of the improved approach described herein, control register space 207 keeps information 208 that defines the confines of the highly protected region of memory 209 within system memory 210. In an embodiment, information 208 is contained within two registers in control register space 207 (SMRR_Range and SMRR_Mask) that specify the confines in protected space 209.

Information 208 is made available to the hardware table walk unit 206 so that the hardware table walk unit 206 can comprehend the confines of the protected space 209. In keeping with the theory that malware might corrupt the SMM code 214 if the SMM code 214 attempts to reach code that is outside the protected memory space 209, according to one embodiment of the approach described herein, when the SMM code 214 is running, the hardware table walk unit 206 includes or is otherwise associated with logic circuitry that compares the address operand of a memory address instruction that seeks to fetch program code against the address range or other definition of the confines of the protected space 209 contained in information 208 and received from the control register space 207.

If the address targeted by the instruction is determined to be outside the confines of the protected space 209, the hardware table walk unit 206 generates a signal 212 (in one embodiment, an unrecoverable machine signal check (MCHECK)) to the hardware that eventually triggers appropriate handler program code 216 (e.g., an MCHECK handler) within the SMM 214. In one embodiment, the signal 212 is implemented as a special Access_Violation_Detected bit that is set in control register space 207 upon detection of the offending code address.

As part of the error reporting process performed by logic circuitry in the hardware in response to the detection of an out of range address, code violation information 213 (e.g., that identifies the address that was attempted to be reached outside the protected space, the nature of the instruction that attempted the offending memory access, state information of the pipeline including the state of the program counter, etc.) is dumped into a storage resource 215 (e.g., register space, part of memory 210, disk) and an address 216 where the code violation information 213 is stored in storage resource 215 is written into machine check register banks 217. The handler 216 looks to the machine check register banks 217, fetches the address 216 and retrieves the code violation information 213. Here, the handler 216 may store the information or aspects thereof to some other storage resource including as a possibility remote storage (e.g., storage connected to the computing system through a network), report the incident to a user, etc.

According to one embodiment, the initial error signal 212 is only generated when program code is attempted to be accessed by an offending SMM memory access instruction (and not data). This permits SMM 214 to reach any item of data with out triggering an alarm.

Also, according to another or combined embodiment, the signal 212 will not be generated if an offending memory access instruction stems from a predicted branch. Here, as is known in the art, some processor pipelines have the intelligence to "guess" along which path a program's execution flow will be directed. As part of the guess, the memory execution units may "pre-fetch" program code instructions that are presumed to be along the path that the program code will flow along. If the processor guesses incorrectly, the fetched program code is flushed. If the processor guesses correctly, the program code is executed.

In order to prevent a false alarm in the case where the processor pre-fetches offending instruction(s) outside the protected space 209 as a consequence of prediction but the processor guesses wrong such that the offending code is ultimately flushed, the hardware does not generate a signal 212 merely when offending code is pre-fetched as a consequence of prediction. Rather, in an embodiment, the hardware will generate the signal 212 in response to both: i) having flagged that the offending code was pre-fetched as a consequence of prediction; and, ii) the "guess" made by the hardware is ultimately deemed correct resulting in the offending code being in the path of execution. Upon both of these conditions being reached the signal 212 will be raised and error handling proceeds as described above.

Figure 3:
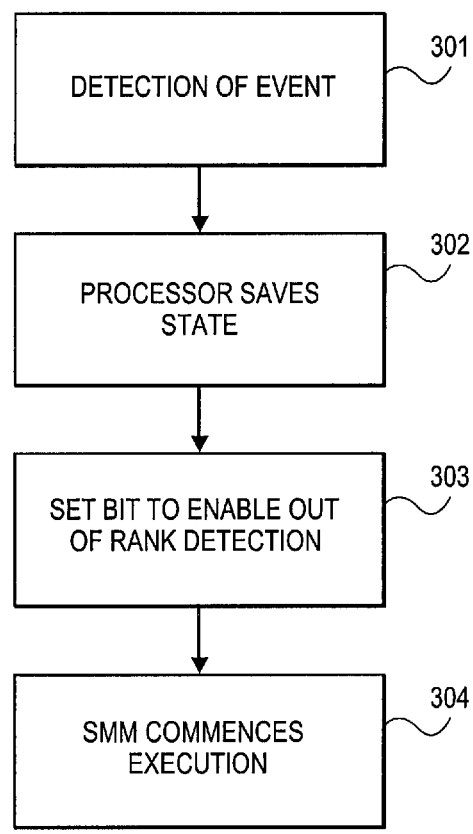
FIG. 3 shows an SMM start sequence that enables a function that detects when SMM attempts to reach program code that is outside of protected space.

In another embodiment, the logic that detects an offending address and generates the error signal 212 is enabled by the setting of a bit in hardware upon the SMM being newly entered. For example, referring to FIG. 3, upon a condition being detected 301 that triggers entry of the SMM, after the processor state is saved 302 (e.g., such that the processor is no longer currently executing any threads), the firmware BIOS enables the memory access trap function 303 and the SMM proceeds to commence operation 304. Depending on implementation the SMM may be considered to be part of the firmware BIOS. By making the enable bit only settable by the BIOS firmware, malware is not permitted to reset the bit so as to disable the function. In a further embodiment, when the SMM terminates and the processor state is restored, as part the SMM termination/processor bring-back, the enablement bit is cleared such that the function is disabled.

Figure 4:
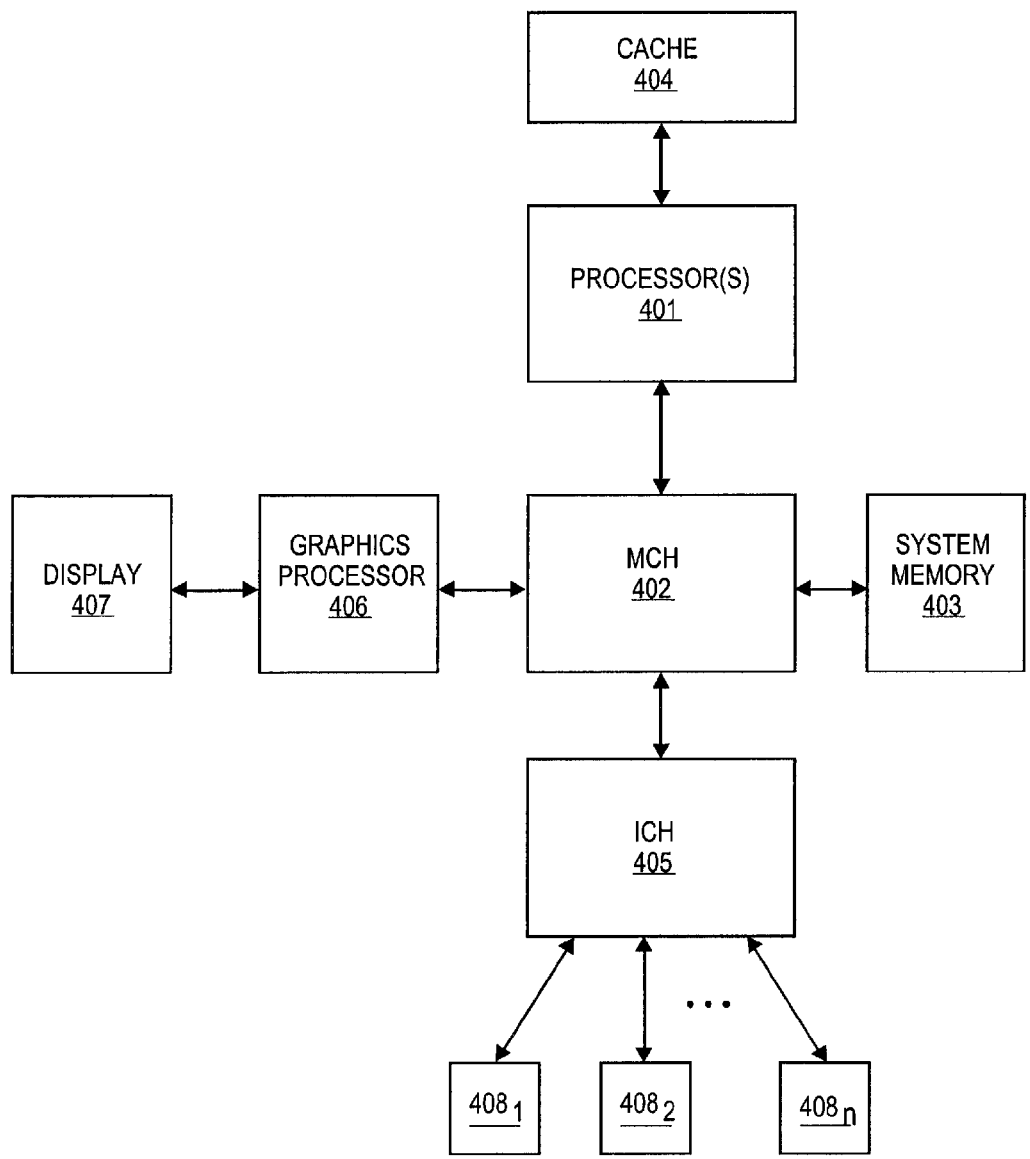
FIG. 4 shows an embodiment of a computing system.

A processing core having the functionality described above can be implemented into various computing systems as well. FIG. 4 shows an embodiment of a computing system (e.g., a computer). The exemplary computing system of FIG. 4 includes: 1) one or more processing cores 401 that may be designed to trap for SMM code that attempts to reach program code outside of protected space; 2) a memory control hub (MCH) 402; 3) a system memory 403 (of which different types exist such as DDR RAM, EDO RAM, etc,); 4) a cache 404; 5) an I/O control hub (ICH) 405; 6) a graphics processor 406; 7) a display/screen 407 (of which different types exist such as Cathode Ray Tube (CRT), flat panel, Thin Film Transistor (TFT), Liquid Crystal Display (LCD), DPL, etc.) one or more I/O devices 408.

The one or more processing cores 401 execute instructions in order to perform whatever software routines the computing system implements. The instructions frequently involve some sort of operation performed upon data. Both data and instructions are stored in system memory 403 and cache 404. Cache 404 is typically designed to have shorter latency times than system memory 403. For example, cache 404 might be integrated onto the same silicon chip(s) as the processor(s) and/or constructed with faster SRAM cells whilst system memory 403 might be constructed with slower DRAM cells. By tending to store more frequently used instructions and data in the cache 404 as opposed to the system memory 403, the overall performance efficiency of the computing system improves.

System memory 403 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 403 prior to their being operated upon by the one or more processor(s) 401 in the implementation of a software program. Similarly, data that a software program determines should be sent from the computing system to an outside entity through one of the computing system interfaces, or stored into an internal storage element, is often temporarily queued in system memory 403 prior to its being transmitted or stored.

The ICH 405 is responsible for ensuring that such data is properly passed between the system memory 403 and its appropriate corresponding computing system interface (and internal storage device if the computing system is so designed). The MCH 402 is responsible for managing the various contending requests for system memory 403 access amongst the processor(s) 401, interfaces and internal storage elements that may proximately arise in time with respect to one another.

One or more I/O devices 408 are also implemented in a typical computing system. I/O devices generally are responsible for transferring data to and/or from the computing system (e.g., a networking adapter); or, for large scale non-volatile storage within the computing system (e.g., hard disk drive). ICH 405 has bi-directional point-to-point links between itself and the observed I/O devices 408.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
    detecting that a memory access of system management mode program code is attempting to reach program code outside of a protected region of memory by comparing a target memory address of a memory access instruction of said system management program code against information that defines confines of said protection region; and
    raising an error signal in response to said detecting; and
    not raising an error signal even though a second memory access instruction for program code targets memory space outside of said protected region because said second memory access instruction is being fetched as a consequence of speculation.

2. The method of claim 1 wherein said information is stored in control register space.

3. The method of claim 2 wherein said error signal includes setting a value in said control register space.

4. The method of claim 1 further comprising raising an error signal because said speculation is deemed to have been correct.

5. The method of claim 1 further comprising storing second information pertaining to said memory access instruction and storing an address where said second information is stored.

6. The method of claim 5 wherein said address is stored in control register space.

7. A semiconductor chip, comprising:
    an instruction execution pipeline having logic circuitry to:
        detect that a memory access of system management mode program code is attempting to reach program code outside of a protected region of memory by comparing a target memory address of a memory access instruction of said system management program code against information that defines confines of said protection region and raise an error signal in response to the detection, and
        not raise an error signal even though a second memory access instruction for program code targets memory space outside of said protected region because said second memory access instruction is being fetched as a consequence of speculation.

8. The semiconductor chip of claim 7 wherein said logic circuitry is coupled to control register space that stores said information.

9. The semiconductor chip of claim 8 wherein said information defines a range of said protected region.

10. The semiconductor chip of claim 9 wherein said logic circuitry is part of hardware table walk logic circuitry within said memory unit.

11. The semiconductor chip of claim 7 wherein said logic circuitry is within a memory unit of said pipeline.

12. The semiconductor chip of claim 7 wherein said logic writes an error signal to control register space in response to detection that said memory access is attempting to reach said program code.

13. A computing system, comprising:
a processor having logic circuitry to
detect that a memory access of system management mode program code is attempting to reach program code outside of a protected region of memory by comparing a target memory address of a memory access instruction of said system management program code against information that defines confines of said protection region and raise an error signal in response to the detection, and
not raise an error signal even though a second memory access instruction for program code targets memory space outside of said protected region because said second memory access instruction is being fetched as a consequence of speculation; and
handler program code within said protected region of memory, said handler program code to read information descriptive of an error condition flagged by said logic circuitry.

14. The computing system of claim 13, wherein said logic circuitry is coupled to control register space that stores said information.

15. The computing system of claim 14, wherein said information defines a range of said protected region.

16. The computing system of claim 13, wherein said logic circuitry is within a memory unit of said pipeline.

17. The computing system of claim 13, wherein said logic circuitry is part of hardware table walk logic circuitry within said memory unit.

18. The computing system of claim 13, wherein said logic writes an error signal to control register space in response to detection that said memory access is attempting to reach said program code.

* * * * *